Oct. 24, 1944.　　W. P. SCHMITTER　　2,361,357
POWER TRANSMISSION
Filed May 26, 1941
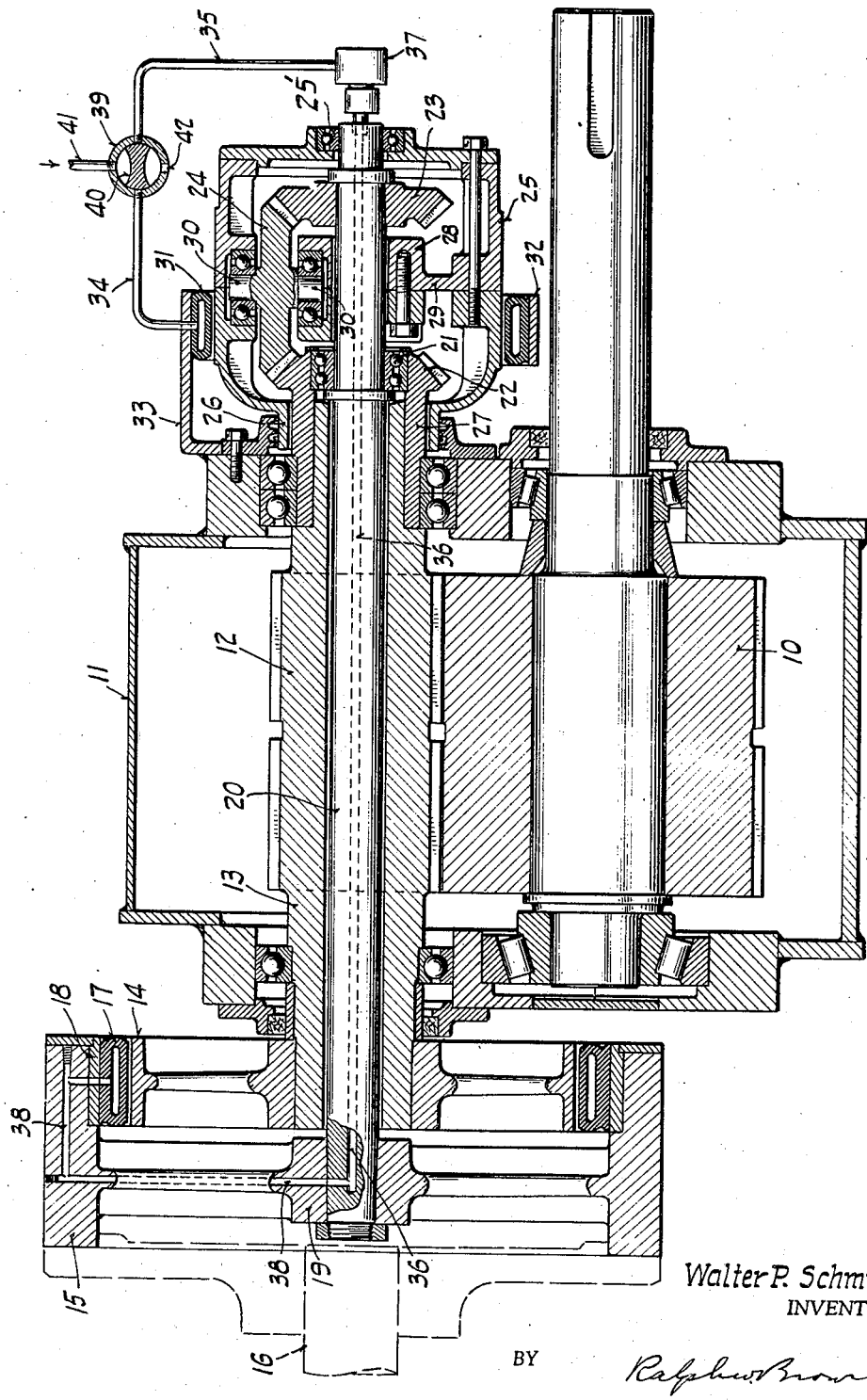
Walter P. Schmitter
INVENTOR.
BY Ralph W. Brown
ATTORNEY.

Patented Oct. 24, 1944

2,361,357

UNITED STATES PATENT OFFICE 2,361,357

POWER TRANSMISSION

Walter P. Schmitter, Wauwatosa, Wis., assignor to The Falk Corporation, Milwaukee, Wis., a corporation of Wisconsin Application May 26, 1941, Serial No. 395,221

6 Claims. (Cl. 74—297)

This invention relates to reversible power transmissions.

In my prior application Serial No. 301,930, filed October 30, 1939, I have disclosed a reversible power transmission involving the use of two clutches coaxially disposed between driving and driven members and selectively operable to control the direction of operation of the transmission.

An object of the present invention is to provide an improved reversible power transmission in which a clutch and brake are alternatively operable to control the direction of operation of the transmission.

Other more specific objects and advantages will appear from the following description of an illustrative embodiment of the present invention.

The single figure of the accompanying drawing is a vertical sectional view of a power transmission constructed in accordance with the present invention.

The power transmission shown comprises a driven gear 10 journalled in a suitable housing 11 and driven by a pinion 12 meshing therewith. The pinion 12 is shown formed integral with a hollow shaft 13 journalled in the housing.

The forward end of the shaft 13 carries an appropriate clutch ring 14, keyed or otherwise fixed thereto, through which the shaft 13 is releasably connectable to an appropriate driver 15 for rotation therewith. In this instance the driver 15 constitutes a fly wheel carried by the crank shaft 16 of a conventional internal combustion engine.

The clutch shown is of a fluid pressure type, such as that disclosed in the application hereinabove identified, and includes a hollow annular gland 17 of rubber or other appropriate flexible material vulcanized onto a ring 18 seated in and fixed to the driver 15. The clutch gland 17 surrounds the clutch ring 14 and by the application of fluid pressure thereto may be expanded into gripping engagement with the clutch ring to close the clutch. Due to the flexibility of the gland 17 the clutch, when closed, provides a flexible driving connection between the driver 15 and the pinion shaft 13.

In this instance the fly wheel 15 is provided with a central hub 19 which provides support for the forward end of a shaft 20 keyed or otherwise fixed thereto. The shaft 20 extends rearwardly through the hollow shaft 13, the latter providing support for the rear end of shaft 20 through an appropriate bearing 21.

The shaft 20 is associated with a brake controlled planetary gear set through which the rear end of the pinion shaft 13 is connected to the driver 15 to effect rotation of the pinion shaft in a direction opposite to that of the driver. In this instance the planetary gear set shown comprises a bevel gear 22 fixed to the rear end of the pinion shaft 13, a bevel gear 23 fixed to the rear end of the shaft 20, and three planet bevel gears, one of which is shown at 24, each of the latter being disposed to mesh with both gears 22 and 23.

The planetary gear set is preferably enclosed within a suitable housing 25 supported at one end by a bearing 25' on the shaft 20 and having a circular flange 26 at its other end loosely surrounding the sleeve portion 27 of the gear 22 so that the housing is normally free to rotate with respect to both gears 22 and 23 about the common axis of those gears. The housing 25 is also preferably provided with an internal central hub portion 28 rigidly connected thereto by an interrupted web 29 and loosely surrounding the shaft 20. Each of the three planet gears 24 is supported by a pair of trunnions 30 disposed radially of the housing 25 and respectively journalled in the shell and hub portions thereof.

It will be noted that the housing 25 is centered by the reaction pressures between the three planet gears 24 and their mating gears 22 and 23, the clearances within the end flange 26 and hub 28 permitting the housing to yield radially in a manner to equalize those pressures.

As above noted, the shaft 20 always rotates with the driver 15. It will of course be understood however that so long as the planet gears 24 and their housing 25 are free to rotate about the common axis of the shafts 20 and 13, they do not interfere with rotation of the shaft 13, and the latter is thus free to rotate with the driver 15 when connected thereto through the clutch above described. Provision is made, however, for releasably restraining the housing 25 against rotation and, when so restrained, the gear 23 acts through the gears 24 to drive the gear 22 and pinion shaft 13 in a direction opposite to that of the driver 15. Any appropriate brake may be employed for this purpose.

In this instance the brake shown comprises a fluid pressure gland 31, similar to the gland 17 above described, which is shown carried by a ring 32 and bracket arm 33 in such position as to normally loosely encircle the housing 25. By supplying fluid to the gland 31 the latter may be expanded into gripping engagement with the housing 25 to thereby effectively hold the housing against rotating.

The fact that the gland 31 is non-rotatable and disposed in a readily accessible position, it is a simple matter to supply and release fluid pressure to and from the same through a simple connection, such as a conduit 34.

The supply and release of fluid pressure to and from the clutch gland 17 is not so simple a matter. The means shown for this purpose includes a conduit 35 connected to an axial duct 36 in the rotating shaft 20 through a suitable joint member 37 disposed at the rear end of that shaft. The duct 36 communicates with a duct 38 in the fly wheel 15 which, in turn, communicates with the interior of the gland 17.

In order to insure exhaust of one of the glands 17 or 31 when the other is inflated, the two conduits 34 and 35 may be both controlled by a single four-way valve of any appropriate type, such as diagrammatically indicated at 39. The valve shown includes a rotary plug 40 operable to connect a supply conduit 41 with either of the conduits 34 or 35 and to connect the other of said conduits to an exhaust port 42.

Various changes may be made in the invention hereinabove specifically described without departing from or sacrificing the advantages of the invention as defined in the appended claims.

I claim:

1. A reversible power transmission comprising a pinion shaft, a gear driven thereby, a driver, a clutch adjacent one end of said shaft for releasably connecting said shaft to said driver for rotation with said driver, means including a radially floating set of planetary gears normally providing an idling connection between said driver and the other end of said shaft, and a brake operable upon said planetary gear set to render the same effective to drive said shaft in a direction opposite to that of said driver, said brake being radially yieldable so as to avoid imposing a radial load on said floating gear set.

2. A reversible power transmission comprising a hollow pinion shaft, a gear driven thereby, a driver, a radially yieldable clutch structure between said driver and said shaft and releasably operable to effect operation of said shaft in one direction, a second shaft extending through said pinion shaft and driven by said driver, a pair of coaxial gears rotatable with said pinion shaft and said second shaft respectively, a planet gear meshing with both of said gears and normally free to revolve in planetary fashion about the common axis of the latter, and radially yieldable means concentric with the orbital path of said planet gear and operable to restrain the planetary action of said planet gear to thereby effect operation of said pinion shaft in an opposite direction.

3. A reversible power transmission comprising a pinion shaft, a gear driven thereby, a driver, a clutch between said driver and one end of said shaft, said clutch including a clutch ring and a torque transmitting flexible annular fluid pressure gland expandible into gripping engagement with said ring to close the clutch to thereby effect rotation of said shaft with said driver, means including a planetary gear set adjacent the other end of said shaft normally providing an idling connection between said driver and shaft, and a brake including a flexible annular fluid pressure gland operable upon said planetary gear set to render the same effective to drive said shaft in a direction opposite to that of said driver.

4. A power transmission comprising a housing, a power transmitting train of intermeshing gears within said housing including a gear supporting shaft journalled at opposite ends in said housing, a radially flexible clutch including a driving clutch ring supported independently of said housing and a clutch ring connected to said shaft, said clutch being operable to flexibly connect said driving ring in driving relation with said shaft, means including a planetary gear system normally constituting an idling connection between said driving ring and said shaft, and a brake operable upon said planetary gear system to effect an alternative driving connection between said driving ring and said shaft.

5. A power transmission comprising a housing, a power transmitting train of intermeshing gears in said housing including a gear supporting shaft journalled therein, a driver mounted independently of said housing, a radially flexible clutch operable to effect a driving connection between said driver and said shaft, means including a planetary gear system normally providing an idling connection between said driver and said shaft, and a brake operable upon said planetary gear system to effect an alternative driving connection between said driver and said shaft, said planetary gear system including a set of planet gears radially floatable about the axis of said planetary gear system when said brake is in operable engagement therewith.

6. A power transmission comprising a driven shaft, a rotary driver, a radially flexible clutch structure for releasably flexibly connecting said driver in driving relation with said shaft to drive said shaft in one direction, a normally idling planetary gear system between said driver and shaft, and means including a brake operable upon said planetary gear system for rendering said system effective to drive said shaft in the opposite direction, said brake including a radially expansible element concentrically disposed with respect to the axis of said planetary gear system and yieldable to avoid imposing a radial load on said system.

WALTER P. SCHMITTER.